United States Patent [19]

Fukushima et al.

[11] 4,442,925
[45] Apr. 17, 1984

[54] VORTEX FLOW HYDRAULIC SHOCK ABSORBER

[75] Inventors: Naoto Fukushima, Fujisawa; Kazuroh Iwata, Kamakura; Kunihiko Hidaka; Keiichiro Yabuta, both of Yokohama, all of Japan

[73] Assignee: Nissan Motor Co., Ltd., Kanagawa, Japan

[21] Appl. No.: 299,155

[22] Filed: Sep. 3, 1981

[30] Foreign Application Priority Data

Sep. 12, 1980 [JP] Japan .................... 55-129926[U]

[51] Int. Cl.³ .................................................. F16F 9/19
[52] U.S. Cl. .................................. 188/282; 188/320; 188/322.14; 188/322.15
[58] Field of Search ............ 188/269, 282, 316, 319, 188/320, 322.13, 322.14, 322.15

[56] References Cited

U.S. PATENT DOCUMENTS

| | | |
|---|---|---|
| 3,220,517 | 11/1965 | Lorenz . |
| 3,362,508 | 1/1968 | Mayer .................... 168/319 |
| 3,672,474 | 6/1972 | Mayer et al. . |
| 4,082,169 | 4/1978 | Bowles . |

FOREIGN PATENT DOCUMENTS

| | | |
|---|---|---|
| 909661 | 4/1954 | Fed. Rep. of Germany . |
| 3007410 | 9/1980 | Fed. Rep. of Germany . |
| 845638 | 5/1939 | France . |
| 1068219 | 6/1954 | France . |
| 1067196 | 5/1963 | United Kingdom . |
| 2065268 | 6/1981 | United Kingdom . |

OTHER PUBLICATIONS

Ser. No. 338,503 filed Jan. 11, 1982, Fukushima et al.

*Primary Examiner*—Duane A. Reger
*Attorney, Agent, or Firm*—Schwartz, Jeffery, Schwaab, Mack, Blumenthal & Koch

[57] ABSTRACT

The shock absorber having a piston reciprocatingly disposed in a cylinder and sized small enough to permit a compact construction. The piston defines therein a vortex chamber with a maximum radius. The vortex chamber communicates with fluid chambers defined in the shock absorber via vortex passages formed in the piston. The vortex passage extends in the ceiling or bottom of the piston and tangentially opens at the upper and lower plane periphery of the vortex chamber. By providing the vortex passages in the above-mentioned manner, the radius of the vortex chamber can be maximized in relation to the radius of the piston thus reducing the size of the piston and, in turn the shock absorber.

9 Claims, 19 Drawing Figures

VORTEX FLOW HYDRAULIC SHOCK ABSORBER

BACKGROUND OF THE INVENTION

The present invention relates generally to a hydraulic shock absorber for producing an absorbing force against a shock by vortex flow of a working fluid. More specifically, the invention relates to an improvement in and related to a construction of a vortex flow chamber in the shock absorber.

The vortex flow shock absorber has been known as to be applied to a vehicle suspension and so on. Such vortex flow shock absorber has a vortex chamber in which the working fluid flows in vortex fashion to produce the absorbing force against a shock. In the vortex flow shock absorber, the absorbing force produced in response to application of the shock depends on a resistance against the fluid flow produced by the vortex in the vortex chamber.

Here, assuming the vortex chamber is sized as shown in FIG. 1, the shock absorbing force related to the size of the vortex chamber can be described by the following equations. At first, note is to be given that since the working fluid used in such kind of hydraulic shock absorber has relatively low viscosity, the fluid in the vortex chamber can be indicated as:
where
  $\rho$: density of the fluid,
  Q: unit volume of the fluid, and
  $V_r$: flow velocity of the fluid at a point r.
Here, since the density of the fluid P and unit volume of the fluid Q are constant, the above equation can be modified to:

$$V_r r = V_i R_i \quad (1)$$

where
  $V_i$: flow velocity of the fluid at the inlet to the vortex chamber, and
  $R_i$: radius of the vortex chamber According to Bernoullis theorem, the equation (1) can be modified as:

$$P_r + \tfrac{1}{2}\rho V_r^2 = P_i + \tfrac{1}{2}\rho V_i^2 \quad (2)$$

where
  $P_r$: fluid pressure at the point r, and
  $P_i$: fluid pressure at the inlet to the vortex chamber.
From the equation (1), the fluid velocity $V_r$ at the point r is represented by:

$$V_r = V_i \cdot \frac{R_i}{r}.$$

Therefore, equation (2) can be modified to:

$$P_r = P_i - \tfrac{1}{2}\rho V_r^2 + \tfrac{1}{2}\rho V_i^2 \quad (3)$$

$$= P_i - \tfrac{1}{2}\rho V_i^2 \left\{ \left(\frac{R_1}{r}\right)^2 - 1 \right\}$$

From the above equation (3), the fluid pressure at the outlet $P_o$ can be obtained from:

$$P_o = P_i - \tfrac{1}{2}\rho V_i^2 \left\{ \left(\frac{R_i}{R_o}\right)^2 - 1 \right\} \quad (4)$$

As apparent from the foregoing, the fluid pressure $P_o - P_i$ is inversely proportional to the radius $R_i^2$ of the vortex chamber. In other word, the drop of the fluid pressure is varied depending on the radius of the vortex chamber. Therefore, it can be understood that the absorbing force against the shock corresponds to the radius of the vortex chamber.

In the meanwhile, the shock absorber is required to be small in size for convenience in application to the vehicle. Reducing the size of the shock absorber has been prevented by the limitation that the piston size must provide a sufficient absorbing force. This is caused because of the necessity of forming vortex passages for communication between the vortex chamber and the fluid chamber defined in the shock absorber. Therefore, it is necessary to take out the size limitation of the piston in order to make the shock absorber compact enough.

SUMMARY OF THE INVENTION

Therefore, it is an object of the present invention to provide a vortex flow shock absorber having a size satisfactorily reduced and providing enough absorbing force in spite of its compact size.

To accomplish the above-mentioned and other objects of the present invention, the shock absorber comprises a piston reciprocably disposed in a cylinder, which piston is sized small enough to permit the shock absorber to be successfully compact. The piston defines therein a vortex chamber with a maximum radius. The vortex chamber communicates with the fluid chamber defined in the shock absorber via vortex passages formed in the piston. The vortex passage extends in the ceiling or bottom of the piston and tangentially open at the upper and lower plane periphery of the vortex chamber.

By providing the vortex passages in the above-mentioned manner, the radius of the vortex chamber can be maximized in relation to the radius of the piston. This helps to reduce the size of the piston and, in turn, to make the shock absorber compact.

According to one aspect of the invention, there is provided a vortex flow shock absorber comprising:
a hollow cylinder defining therein a fluid chamber filled with a working fluid, a piston reciprocally disposed within the fluid chamber and dividing the chamber into upper first chambers and lower second chamber and defining therein a vortex chamber in which the working fluid flows in vortex fashion to produce an absorbing force, first fluid passage means for establishing communication between one of the first and second chambers and the vortex chamber, which first fluid passage means extends through one of horizontal sections of the piston and having an inner end tangentially opening to the vortex chamber on the horizontal periphery of the vortex chamber for discharging the fluid into the vortex chamber in vortex fashion, and second fluid passage means for communication between the other fluid chamber and the vortex chamber, the second fluid passage means having a flow area of the fluid restricting the fluid flow for producing the absorbing force.

In the specific embodiment, a direct-acting shock absorber comprises an outer hollow cylinder, an inner hollow cylinder coaxially disposed within the outer cylinder to define therebetween a fluid reservoir chamber, the inner cylinder defining therein a fluid chamber filled with a working fluid, a piston reciprocally disposed within the fluid chamber to divide the fluid chamber into upper first chamber and lower second chamber, the piston defining therein a substantially circular vortex chamber, first fluid passage means for defining first fluid passage in the piston for communication between the first chamber and the vortex chamber, the first fluid passage extends through the upper horizontal section of the piston and opening to the vortex chamber so that it may discharge the working fluid flowing therethrough in a tangential direction with respect to the circle of the vortex chamber, second fluid passage means for defining a second fluid passage in the piston for communication between the vortex chamber and the second chamber, the second fluid passage having a sectional area adapted to produce resistance against the fluid flowing therethrough, a bottom fitting fitted to the lower end of the inner cylinder and defining therein a substantially circular vortex chamber, third fluid passage means for defining third fluid passage in the piston for communication between the second chamber and the vortex chamber, the third fluid passage extending through the upper horizontal section of the bottom fitting and opening to the vortex chamber so that it may discharge the working fluid in tangential direction with respect to the circle of the bottom fitting, and fourth fluid passage means for defining a fourth fluid passage in the piston for communication between the vortex chamber and the fluid reservoir chamber, which fourth fluid passage has the sectional area adapted for producing resistance against the fluid flowing therethrough.

BRIEF DESCRIPTION OF THE DRAWINGS

The present invention will be more fully understood from the detailed description given herebelow and from the accompanying drawings of preferred embodiments of the invention, which, however, should not be taken as limitative to the invention but for elucidation and explanation only.

In the drawings

DESCRIPTION OF THE PREFERRED EMBODIMENT

Figure 2:
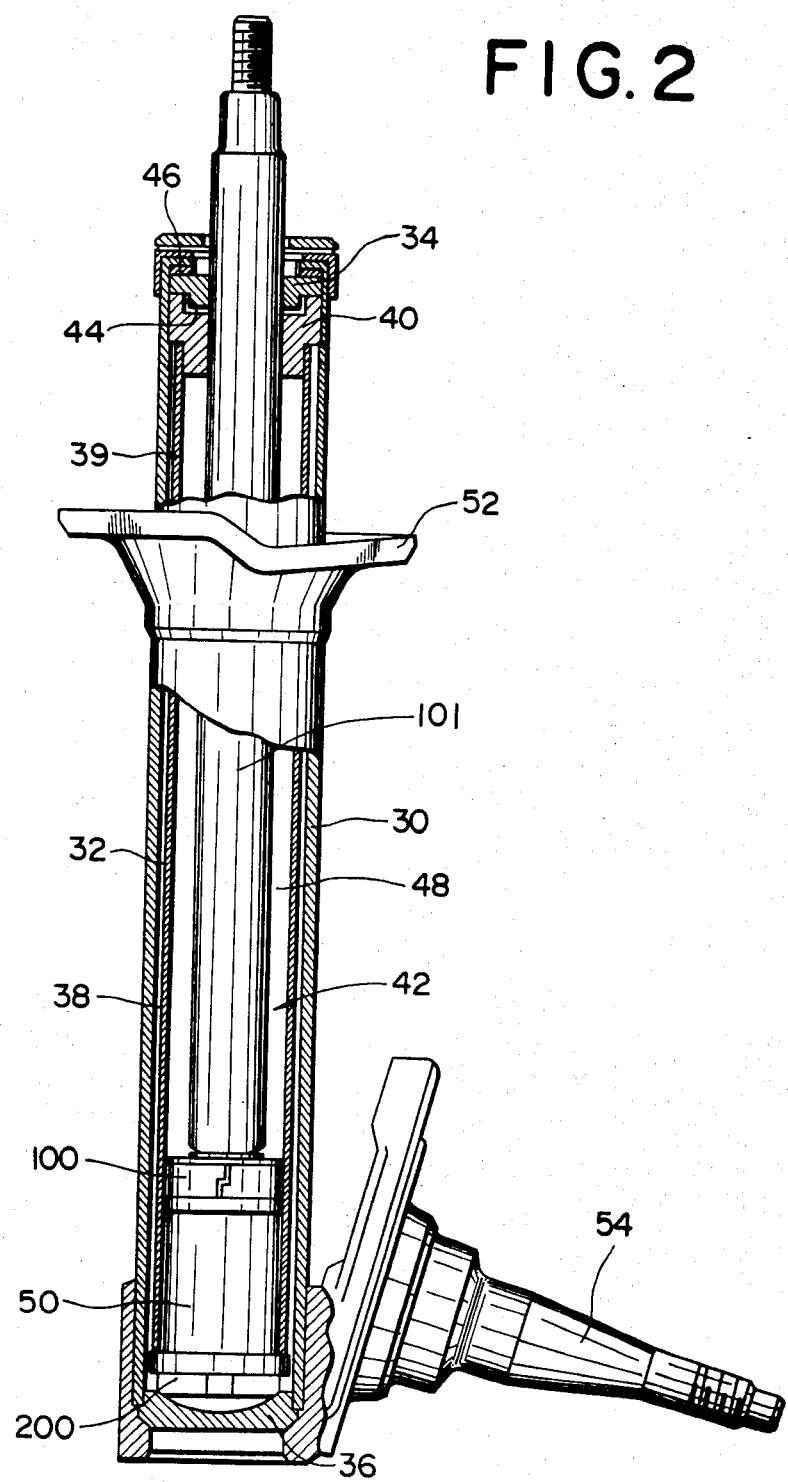
FIG. 2 is a longitudinal section of a first embodiment of a vortex flow shock absorber of a direct-acting type.

Referring now to FIG. 2, there is illustrated the first embodiment of a direct-acting shock absorber according to the present invention. The shock absorber includes outer and inner cylinders 30 and 32 coaxially arranged with respect to each other. The outer cylinder 30 is closed at both its upper and lower ends with an elastic sealer 34 and an end fitting 36. The inner cylinder 32 is disposed within the outer cylinder 30 spaced-apart relationship to define therebetween a fluid reservoir chamber 38. A bottom fitting 200 is attached at the lower end of the inner cylinder 32. The upper end of the inner cylinder 32 is closed with an elastic sealer 40 to define a fluid chamber 42 in the inner cylinder, in which is filled a working fluid. The sealer 40 has a recess 44 on the upper surface, which recess receives a projecting portion downwardly protruding on the lower surface of the sealer 34. Also, the sealer 34 secures a sealing ring 46 between the inner surface of the upper end of the outer cylinder 30.

Figure 3:
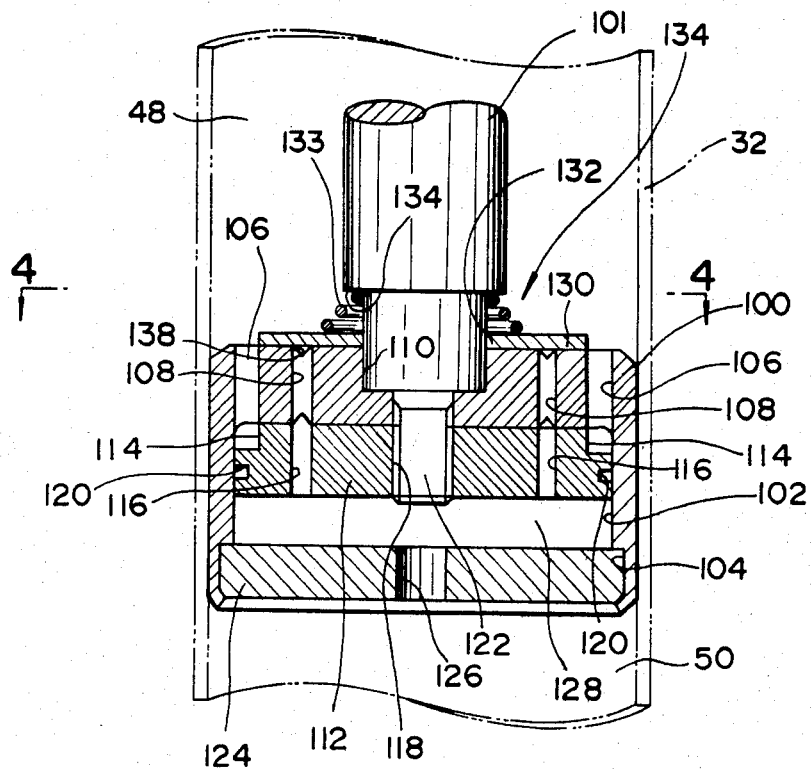
FIG. 3 is an enlarged section of a piston in the shock absorber of FIG. 2.
Figure 4:
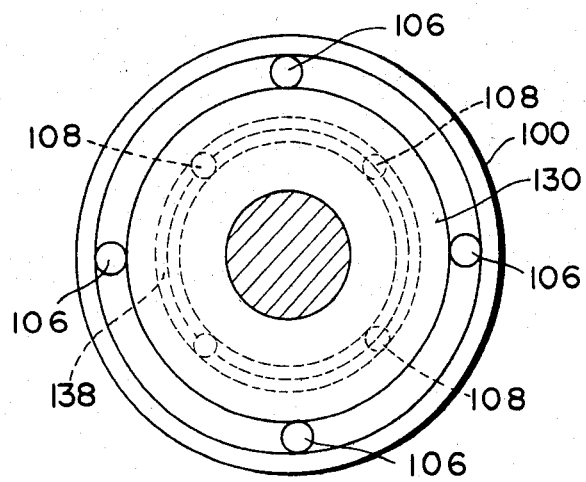
FIG. 4 is a plan view of the piston of FIG. 3 viewed from the section taken 4—4 of FIG. 3.
Figure 5:
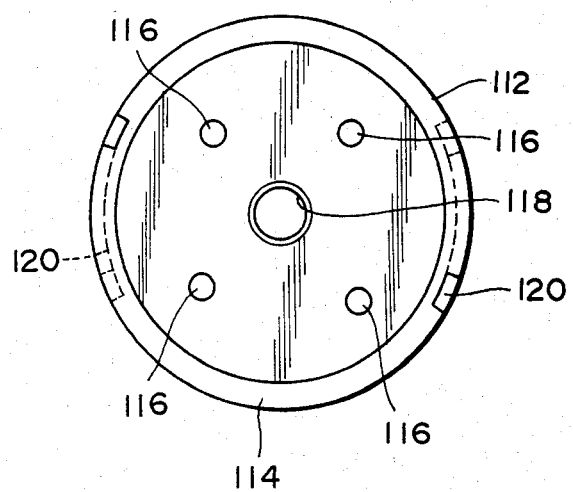
FIG. 5 is a plan view of a valve member inserted into the piston of FIG. 3.

A piston 100 is movably disposed within the fluid chamber 42. The piston 100 is connected to the lower end of a piston rod 101. The piston 100 divides the fluid chamber 42 into upper and lower fluid chambers 48 and 50 respectively. As shown in FIGS. 3 to 5, the piston 100 is formed with a circular groove 102. The lower end of the piston groove 102 is stepped to define the stepped lower section 104.

Figure 6:
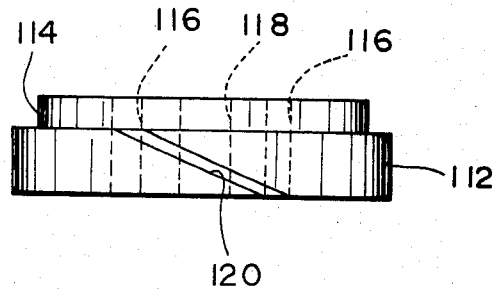
FIG. 6 is a front elevation of the valve member of FIG. 5.
Figure 7:
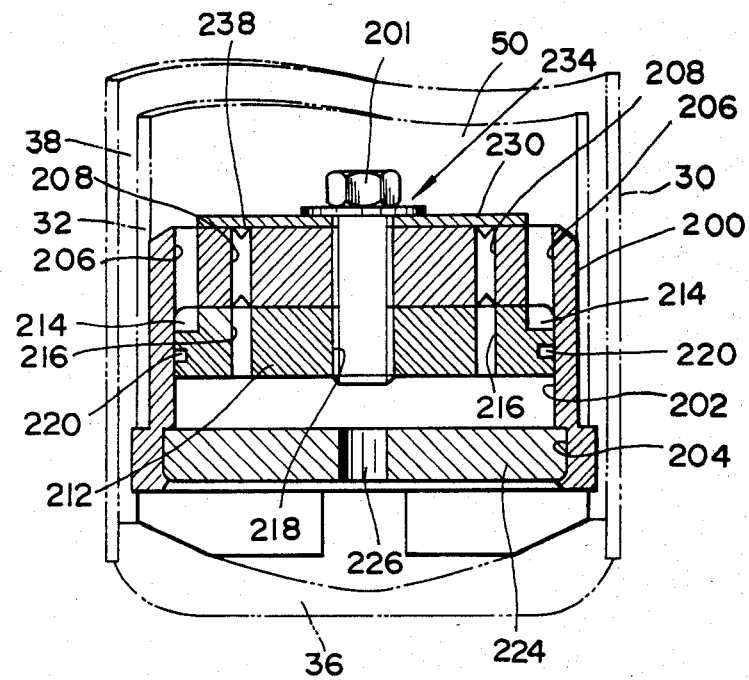
FIG. 7 is a transverse section of an bottom fitting in the shock absorber of FIG. 2.

The piston 100 is formed with vertically extending openings 106 adjacent the circumference thereof. The piston 100 is also formed with vertically extending openings 108 remote from the circumference of the piston. The piston 100 is further formed with a central stepped opening 110. A valve member 112 is disposed within the groove 102. As shown in FIGS. 6 and 7, the valve member 112 is formed with a cut-out 114 on the upper circumferential edge. The valve member 112 is also formed with vertically extending opening 116. The openings 116 are axially aligned with the openings 108, respectively. The valve member 112 is further formed with a central threaded opening 118.

The valve member 112 formed with a pair of grooves 120 extending on the circumference. The groove 120 opens toward the cut-out 114 at the upper end and opens at the lower end in a direction tangentially to the circle of the groove 102. The groove 120 defines a vortex passage between the inner periphery of the inner cylinder 32. The threaded opening 118 engages with a threaded end 122 of the piston rod 101.

To the stepped lower section 104, a fitting 124 with a central opening 126 is resiliently secured to define a vortex chamber 128 within the groove 102. The vortex chamber 128 communicates with the upper fluid chamber 48 via the vortex passages 120, the cut-out 114 and the through openings 106. In turn, the vortex chamber 128 communicates with the lower fluid chamber 50 via the through opening 126.

The vortex chamber 128 further communicates with the upper fluid chamber 48 via the through openings 108. The upper ends of the through openings 108 are closed by a closure disc 130 which is passed with the piston rod 101 through a central opening 132 therefore, and movable along the piston rod axis. The closure disc 130 is urged toward the upper end of the through openings 108 with a coil spring 133. The upper end of the spring 133 is seated onto a horizontally stepped face 134 of the piston rod 101 and the lower end thereof is seated onto the closure disc 130. The closure disc 130 and the coil spring 133 constitute an one-way valve 136 for restricting the fluid flow in the direction from the upper fluid chamber 48 to the vortex chamber. Each of the upper ends of the through openings 108 communicates with adjacent ends of the other openings 108 via a substantially V-shaped groove formed on the upper surface of the piston.

Figure 8:
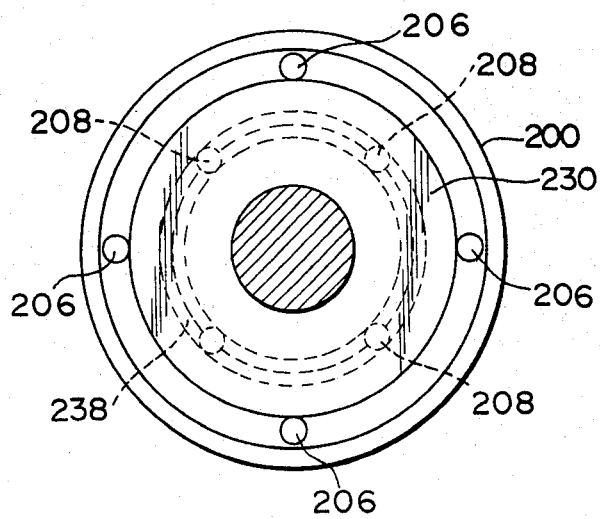
FIG. 8 is a plan view of the bottom fitting of FIG. 7 as viewed from the section taken 8—8 of FIG. 7.
Figure 9:
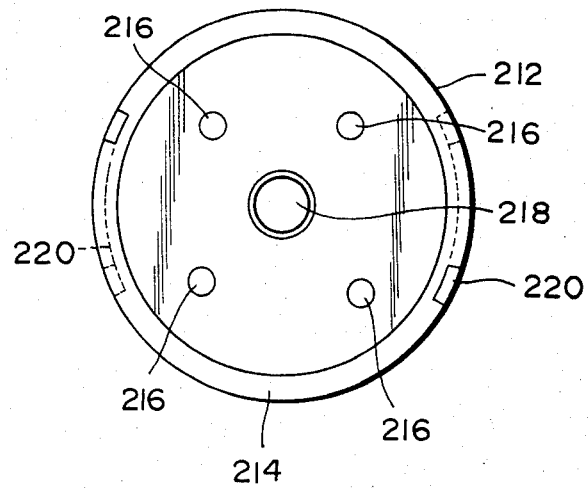
FIG. 9 is a plan view of a valve member inserted into the end fitting of FIG. 7.
Figure 10:
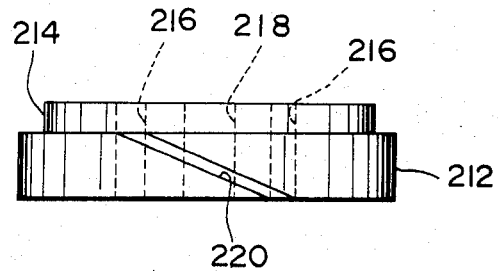
FIG. 10 is a front elevation of the valve member of FIG. 9.
Figure 11:
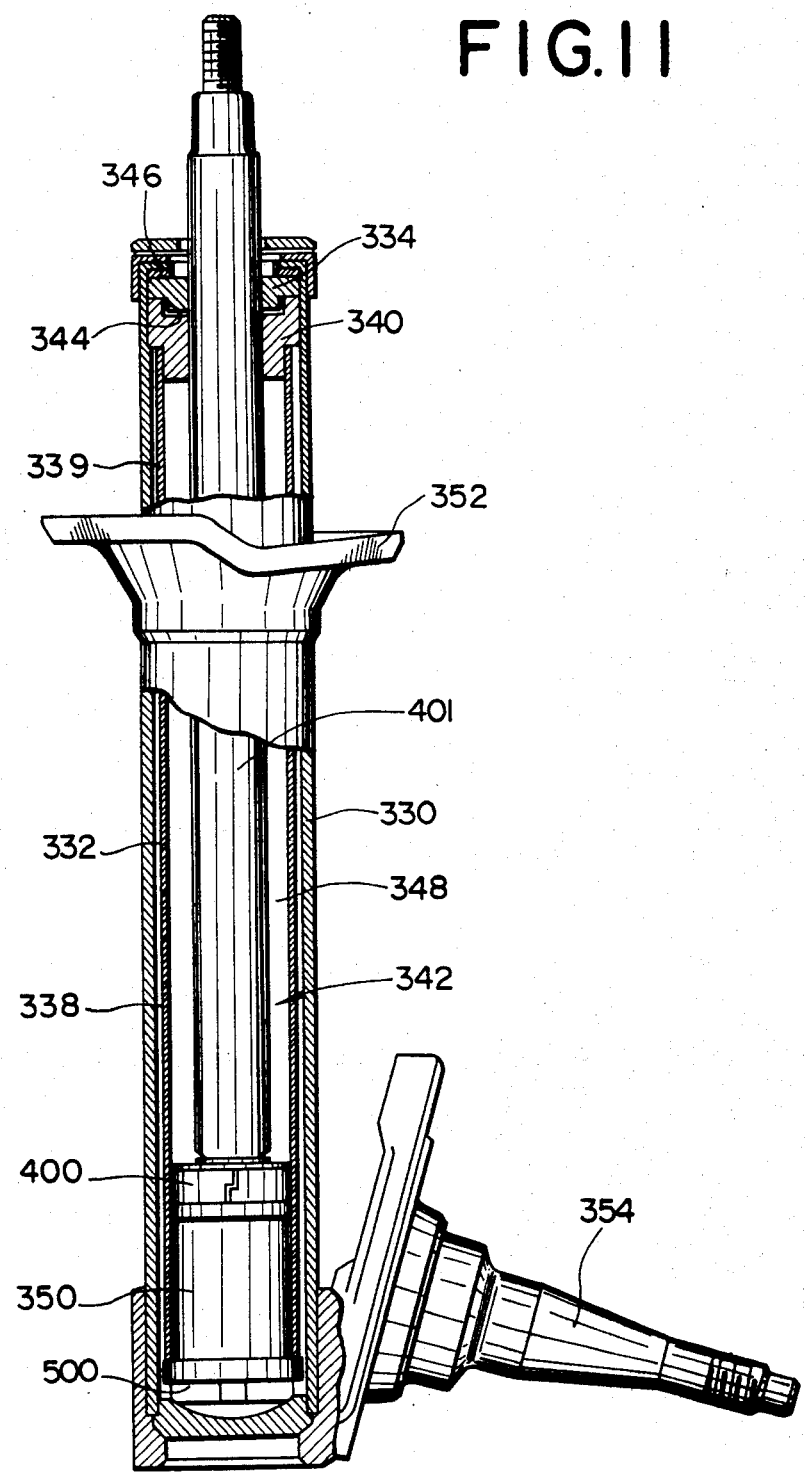
FIG. 11 is a longitudinal section of the second embodiment of the shock absorber according to the present invention.
Figure 12:
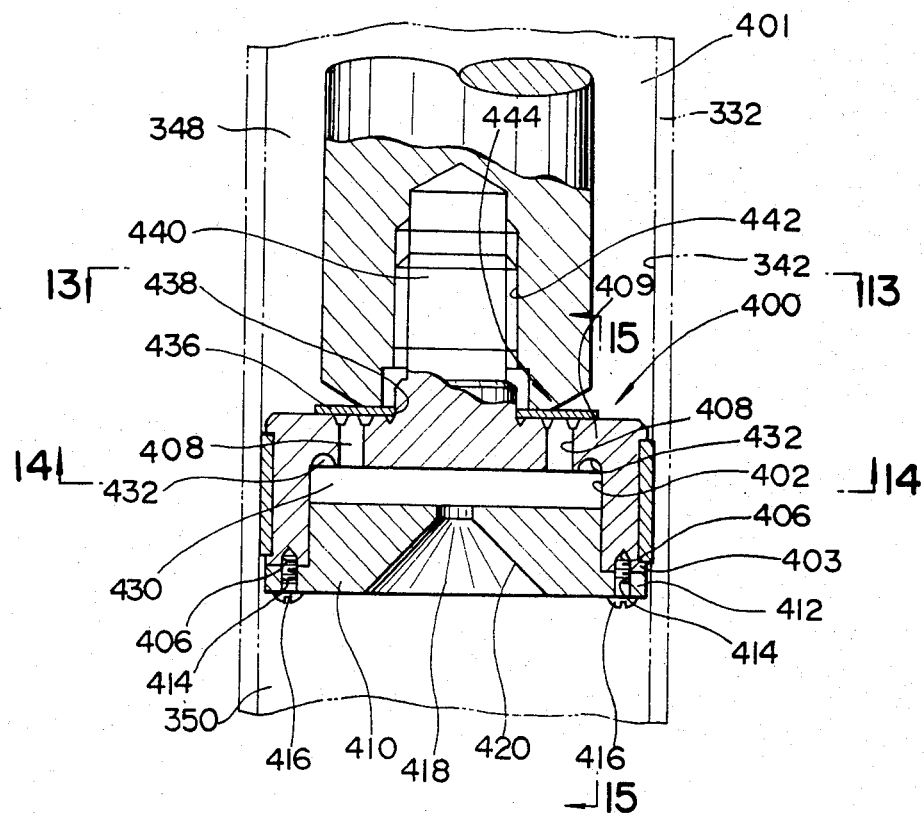
FIG. 12 is an enlarged transverse section of a piston of the shock absorber of FIG. 11.

FIGS. 8 to 10 show the bottom fitting 200 applied to the shock absorber of the first embodiment, shown in FIG. 2. Generally, the construction of the bottom fitting 200 is the same as that of the foregoing piston 100. Similarly to the foregoing piston 100, the bottom fitting 200 is formed with a circular groove 202. The lower end of the groove 202 is stepped to define the lower stepped section 204.

The bottom fitting 200 is formed with vertically extending openings 206 adjacent the circumference thereof. The bottom fitting 200 is also formed with vertically extending openings 208 remote from the circumference of the piston. The bottom fitting 200 is further formed with a central stepped opening 210. A valve member 212 is disposed within the groove 202. As shown in FIGS. 8 and 10, the valve member 212 is formed with a cut-out 214 on the upper circumferential edge. The valve member 212 is also formed with vertically extending opening 216. The openings 216 are axially aligned with the openings 208, respectively. The valve member 112 is further formed with a central threaded opening 118.

The valve member 212 is formed with a pair of grooves 220 extending on the circumference thereof. The groove 220 opens toward the cut-out 214 at the upper end and opens the lower end in a direction tangentially to the circle of the groove 202. The groove 220 defines a vortex passage between the inner periphery of the inner cylinder 32. The threaded opening 118 engages with a threaded end 122 of the fastening bolt 201.

To the stepped lower section 204, a fitting 224 with a central opening 226 is resiliently secured to define a vortex chamber 228 within the groove 202. The vortex chamber 228 communicates with the lower fluid chamber 50 via the vortex passages 220, the cut-out 214 and the through openings 206. In turn, the vortex chamber 228 communicates with the fluid reservoir chamber 38 via the through opening 226.

The vortex chamber 228 further communicates with the lower fluid chamber 50 via the through openings 208. The upper ends of the through openings 208 are closed by a closure disc 230 which is passed with the fastening bolt 201 through a central opening 232 therefore, and elastically movable to open and close the upper end of the through opening 208. The closure disc 230 is formed of an elastic material and is per se urged toward the upper end of the through openings 208 with a elastic force serving as the set pressure. Thus, the closure disc 230 constitutes an one-way valve 236 for restricting the fluid flow in the direction from the upper fluid chamber 48 to the vortex chamber.

In the compression stroke, the piston 100 moves downwardly to expand the volume of the upper fluid chamber 48 with reducing of the fluid pressure therein and to compress the volume of the lower fluid chamber 50 with increasing of the fluid pressure. Due to the fluid pressure difference between the upper and lower fluid chambers 48 and 50, the fluid flow is produced in the direction from the lower fluid chamber 50 to the upper fluid chamber 48. The fluid flows into the vortex chamber 128 via the through opening 126 of the fitting 124. The fluid in the vortex chamber 128 flows through the vortex passages 120, the cut-out 114 and the through openings 106 to the upper fluid chamber 48. At the same time, the closure disc 130 is forced upwardly against a set pressure of the coil spring 132 to open the upper end of the through openings 108 to allow the fluid in the vortex chamber 128 therethrough.

On the other hand, due to increasing of the fluid pressure, the fluid in the lower fluid chamber 50 flows into the vortex chamber 228 via the through openings 208, the cut-out 214 and the vortex passages 220. Since the fluid flows in a tangential direction from the vortex passage, a vortex is produced in the vortex chamber 228 to limit the flow amount of the fluid. The fluid in the vortex chamber 228 flows into the fluid reservoir chamber 38. By increasing of the fluid amount, a gas filled in the upper section 39 of the fluid reservoir chamber is reduced in volume as a result of accumulating pressure.

In the expansion stroke, the piston 100 moves upwardly to expand the volume of the lower fluid chamber 50 with reducing of the fluid pressure therein and to reduce the volume of the upper fluid chamber 48 with increasing of the fluid pressure. Due to the fluid pressure difference between the upper and lower fluid chambers 48 and 50, the fluid flow is produced in the direction from the upper fluid chamber 48 to the lower fluid chamber 50. The fluid flows into the vortex chamber 128 via the vortex passages 120. The fluid in the vortex chamber 128 flows through the through opening 126 to the lower fluid chamber 50.

On the other hand, due to reducing of the fluid pressure, the fluid in the fluid reservoir chamber 38 flows into the vortex chamber 228 via the through opening 226. The fluid in the vortex chamber 228 flows into the lower fluid chamber 50.

During the fluid flow as set forth, the vortex passages 120 serves as an orifice to limit the fluid flow therethrough to produce a resistance against the fluid flow. On the other hand, the vortex in the vortex chamber 228 also produces a resistance against the fluid flowing through the vortex chamber. If the piston stroke is so small or the piston speed is so low that is cannot generate a sufficient resistance against the fluid flowing through the vortex chamber 228, the resistance provided by the orifice effect of the vortex passage 120 works as the main factor in absorbing force against the shock applied to the shock absorber. When the piston stroke becomes large enough or the piston speed is increased sufficiently high, the vortex in the vortex chamber 228 provides a sufficient resistance against the fluid flowing through the vortex chamber.

Here, since the fluid pressure in the vortex chamber 128 of the piston 100 is substantially the same as that in the lower fluid chamber, if the fluid pressure in the lower chamber becomes greater than that of the set pressure of the closure disc 130, the closure disc 130 is moved upwardly to allow the fluid flowing therethrough. Thus, the closure disc 130 and the openings 108 serve as relief valve for preventing the shock absorber from producing excessive absorbing force.

As stated, the absorbing force produced in the vortex chamber by the vortex is proportional to the diameter of the vortex chamber. According to the shown embodiment of the present invention, since the vortex passages are formed on the circumference of the valve member disposed in the groove of the piston, the diameter of the vortex chamber can be at a maximum in spite of the presence of the vortex passages. This, in turn, allows the piston to have a reduced diameter to permit the shock absorber of reduced size.

Figure 1:
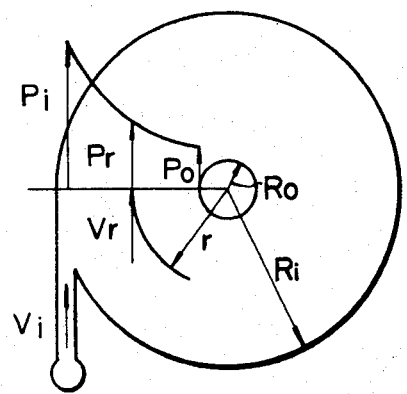
FIG. 1 is an explanatory illustration of a vortex chamber showing vortex flow in the vortex chamber.

In FIG. 1, the reference numerals 52 and 54 respectively represent a spring seat and a steering knuckle. However, the shown embodiment illustrates these element for the purpose of showing the specific construction of the shock absorber. It should be appreciated that these are not always necessary to be provided in the shock absorber of the present invention.

FIG. 11 to 15 show the second embodiment of the direct-acting shock absorber according to the present invention. Likewise to the foregoing first embodiment, the shock absorber includes outer and inner cylinders 330 and 332 coaxially arranged with respect to each other. The outer cylinder 330 is closed the both upper and lower ends with an elastic sealer 334 and an end fitting 336. The inner cylinder 332 is disposed within the outer cylinder 330 in spaced-apart relationship to define therebetween a fluid reservoir chamber 338. A bottom fitting 500 is attached at the lower end of the inner cylinder 332. The upper end of the inner cylinder 332 is closed with an elastic sealer 340 to define a fluid chamber 342 in the inner cylinder, in which is filled a working fluid. The sealer 340 has a recess 344 on the upper surface, which recess receives a projecting portion downwardly protruding on the lower surface of the sealer 334. Also, the sealer 334 secures a sealing ring 346 between the inner surface of the upper end of the outer cylinder 330.

The piston 400 is movably disposed within the fluid chamber 342. The piston 400 is attached onto the lower end of the piston rod 401. The piston 400 divides the fluid chamber 342 into upper and lower chamber 348 and 350 respectively. As shown in FIGS. 12 to 15, the piston 400 is formed with a circular recess 402. The lower end of the vertical circumference 403 of the piston 400 is formed with a plurality of threaded bore 406 vertically extending from the lower end thereof. The piston 400 is also formed with a vertically extending opening 408 in the horizontal plane 409 thereof.

The substantially disc-shaped fitting 410 is attached to the lower end of the piston 400. The fitting is provided with a laterally extending flange portion 412. A plurality of through openings 414 are formed in the flange portion 412. The openings 414 are respectively aligned with the threaded bores 406 of the piston to receive screws 416 for securing the fitting 410 onto the piston. The fitting 410 is also formed with a central opening 418 which has a tapered lower section 420.

Figure 13:
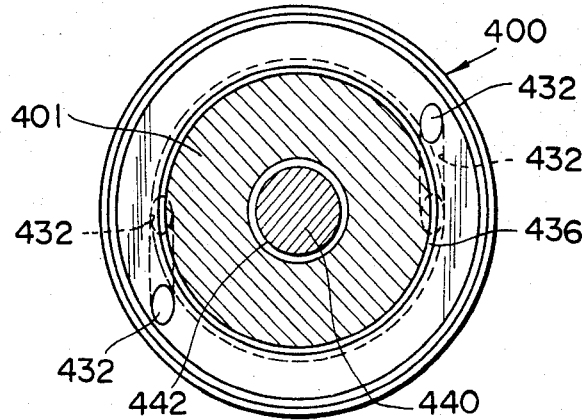
FIG. 13 is a plan view of the piston of FIG. 12 as viewed taken along line 13—13 of FIG. 12.
Figure 14:
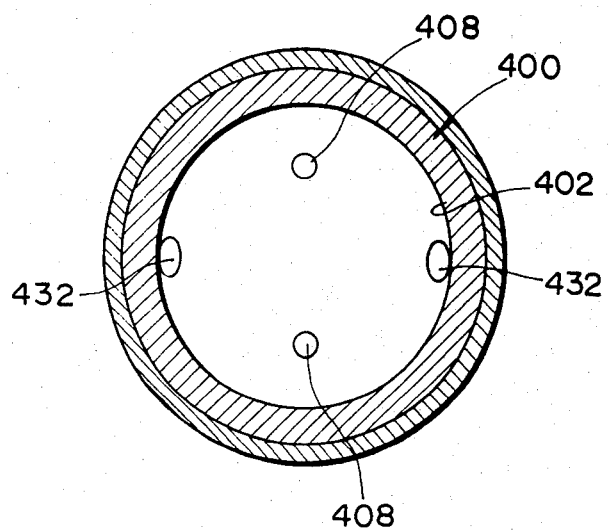
FIG. 14 is a cross-section of the piston of FIG. 12 taken along line 14—14 of FIG. 12.
Figure 15:
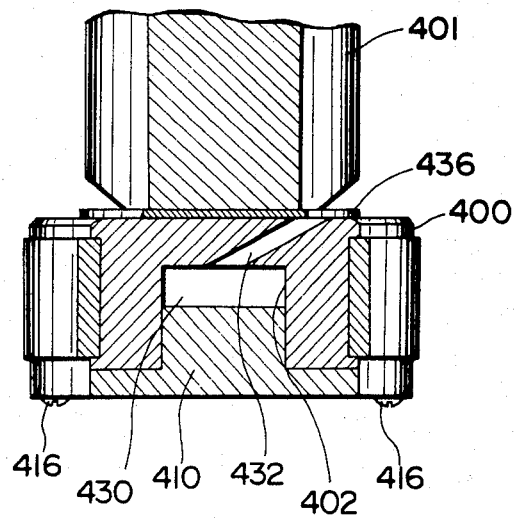
FIG. 15 is a section of the piston of FIG. 12 taken along line 15—15 of FIG. 12.
Figure 16:
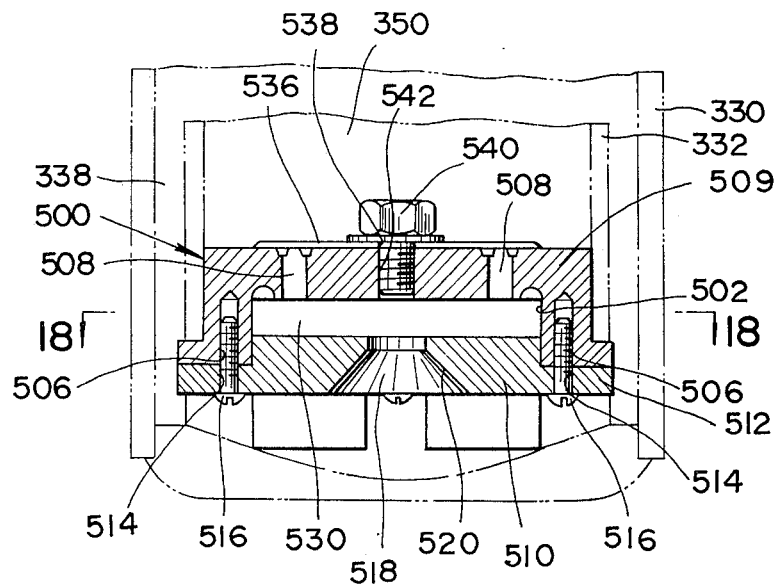
FIG. 16 is an enlarged transverse section of the second embodiment of an bottom fitting in the shock absorber of FIG. 11.
Figure 17:
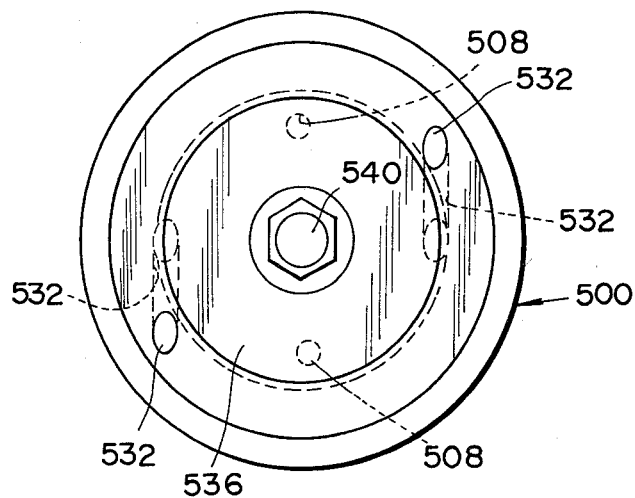
FIG. 17 is a plan view of the bottom fitting of FIG. 16 taken along line 17—17 of FIG. 16.
Figure 18:
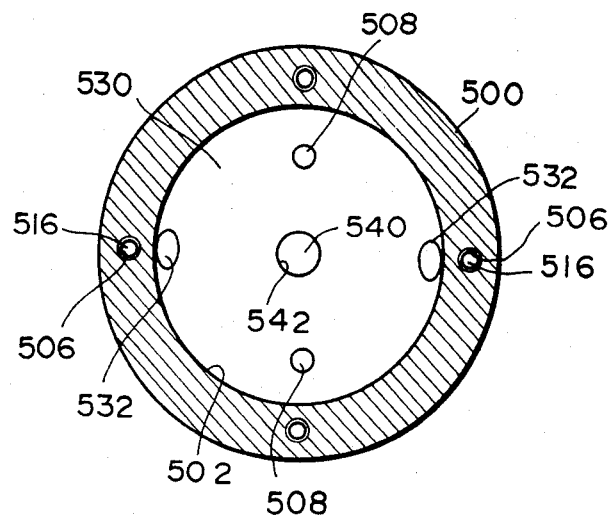
FIG. 18 is a cross-section of the bottom fitting of FIG. 16 taken along line 18—18 of FIG. 16.
Figure 19:
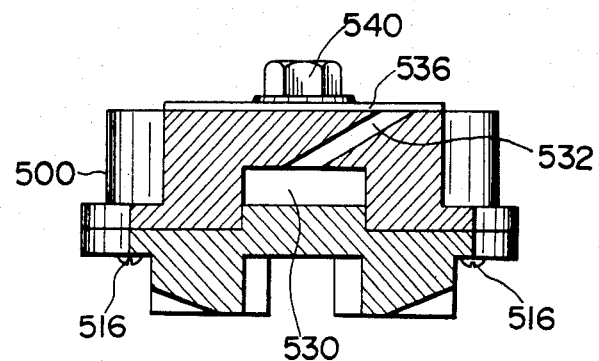
FIG. 19 is a section of the bottom fitting of FIG. 16 taken along line 19—19 of FIG. 16.

In the assembled position, the piston 400 and the fitting 410 define a vortex chamber 430 therebetween. The vortex chamber 430 communicates with the upper chamber 348 via vortex passages 432 which is formed in the piston 400 and extends tangentially in relation to the circle of the circular recess 402, as shown in FIGS. 13 to 15. The vortex chamber 430, in turn, communicates with the lower chamber 350 via the central opening 418 of the fitting 410. Further, the vortex chamber 430 communicates with the upper chamber 348 via the openings 408 of the piston. The opening 408 is closed at its upper end 434 with a resilient disc-shaped plate 436 which has a central opening 438. Through the opening 438, a threaded projection 440 provided to the piston 400 extends upwardly to engage with a threaded bore 442 formed in the piston rod 401. Thus, the circumferential edge of the openings 438 is secured between the upper surface of the piston 400 and the lower end of the piston rod 401. The resilient plate 436 thus fitted constitutes an one-way valve 444 with the vertical opening 408 to permit the fluid flow in the direction from the vortex chamber 430 to the upper chamber 348. Here, the resilient force of the resilient plate 436 serves as a set pressure to which the one-way valve 444 is responsive to open.

Again, as apparent from FIGS. 13 to 15, the vortex passage 432 has the outer end opening to the upper plane surface of the piston and the inner end opening to the lower plane surface of the horizontal section 409. Thus, the vortex passage 342 extends through the horizontal section 409 in vertically tilted position and in the direction tangent of the circle of the circular recess 402.

As shown in FIGS. 15 to 18, the bottom fitting 500 is formed with a circular recess 502. The lower end of the vertical circumference 503 of the bottom fitting 400 is formed with a plurality of threaded bore 506 vertically extending from the lower end thereof. The bottom fitting 500 is also formed with a vertically extending opening 508 in the horizontal plane 509 thereof.

The substantially disc-shaped fitting 510 is attached to the lower end of the bottom fitting 500. The fitting is provided with a laterally extending flange portion 512. A plurality of through openings 514 are formed in the flange portion 512. The openings 514 are respectively aligned with the threaded bores 506 of the bottom fitting 500 to receive screws 56 for securing the fitting 510 onto the piston. The fitting 510 is also formed with a central opening 518 which has a tapered lower section 520.

In the assembled position, the bottom fitting 500 and the fitting 510 define a vortex chamber 530 therebetween. The vortex chamber 530 communicates with the lower chamber 350 via vortex passages 532 which is formed in the bottom fitting 500 and extends tangentially in relation to the circle of the circular recess 502, as shown in FIGS. 16 to 19. The vortex chamber 530, in turn, communicates with the fluid reservoir chamber 338 via the central opening 518 of the fitting 510. Further, the vortex chamber 350 communicates with the lower chamber 350 via the openings 508 of the piston. The opening 508 is closed the upper end 534 with a resilient disc-shaped plate 536 which has a central opening 538. Through the opening 538, a fastening bolt 540 extends downwardly to engage with a threaded bore 542 formed in the bottom fitting 500. Thus, the circumferential edge of the openings 538 is secured on the upper surface of the bottom fitting 500. The resilient plate 536 thus fitted constitutes an one-way valve 544 with the vertical opening 508 to permit the fluid flow in the direction from the vortex chamber 530 to the lower chamber 350. Here, the resilient force of the resilient plate 536 serves as a set pressure to which the one-way valve 444 is responsive to open.

In the compression stroke, the piston 400 moves downwardly to expand the volume of the upper fluid chamber 348 with reducing of the fluid pressure therein and to compress the volume of the lower fluid chamber 350 with increasing of the fluid pressure. Due to the fluid pressure difference between the upper and lower fluid chambers 348 and 350, the fluid flow is produced in the direction from the lower fluid chamber 350 to the upper fluid chamber 348. The fluid flows into the vortex chamber 430 via the through opening 418 of the fitting 410. The fluid in the vortex chamber 430 flows through the vortex passages 432 and the through openings 408 to the upper fluid chamber 348. At the same time, the closure disc 436 is forced upwardly against a set pressure to open the upper end of the through openings 408 to allow the fluid in the vortex chamber 430 therethrough.

On the other hand, due to increasing of the fluid pressure, the fluid in the lower fluid chamber 350 flows into the vortex chamber 530 of the bottom fitting 500 via the vortex passages 532. Since the fluid flows in a tangential direction from the vortex passage, a vortex is produced in the vortex chamber 530 to limit the flow amount of the fluid. The fluid in the vortex chamber 530 flows into the fluid reservoir chamber 338. By increasing of the fluid amount, a gas filled in the upper section 339 of the fluid reservoir chamber is reduced in volume as a result of accumulating pressure.

In the expansion stroke, the fluid flow in the opposite direction is generated. During this piston stroke, the piston produces the absorbing force by greating vortex flow in the vortex chamber thereof and the bottom fitting produces the absorbing force by orifice effect of the through openings, as set forth in the foregoing first embodiment.

During the fluid flow as set forth, the vortex passages 432 serves as an orifice to limit the fluid flow therethrough to produce a resistance against the fluid flow. On the other hand, the vortex in the vortex chamber 530 also produces the resistance against the fluid flowing through the vortex chamber. If the piston stroke is so small or the piston speed is so low that it cannot generate a sufficient resistance against the fluid flowing through the vortex chamber 530, the resistance provided by the orifice effect of the vortex passages 432 works at the main factor of an absorbing force against the shock applied to the shock absorber. When the piston stroke becomes large enough or the piston speed is increased to sufficiently high, the vortex in the vortex chamber 530 provides a sufficient resistance against the fluid flowing through the vortex chamber.

Here, since the fluid pressure in the vortex chamber 430 of the piston 400 is substantially the same as that in the lower fluid chamber, if the fluid pressure in the lower chamber becomes greater than that of the set pressure of the closure disc, the closure disc 436 is moved upwardly to allow the fluid flowing therethrough. Thus, the closure disc 436 and the openings 408 serve as relief valve for presenting the shock absorber from producing excessive absorbing force.

As stated, the absorbing force produced in the vortex chamber by the vortex is proportional to the diameter of the vortex chamber. According to the shown embodiment the present invention, since the vortex passages are formed on the circumference of the valve member disposed in the groove of the piston, the diameter of the vortex chamber can be a maximum in spite of the presence of the vortex passages. This, in turn, allows the piston to be of a reduced diameter to permit the shock absorber to be reduced in size.

What is claimed is:

1. A vortex flow shock absorber comprising:
 a hollow cylinder defining therein a fluid chamber filled with a working fluid;
 a piston reciprocally disposed within said fluid chamber and dividing said chamber into upper first chamber and lower second chamber and defining therein a vortex chamber in which said working fluid flows in vortex fashion to produce an absorbing force;
 first fluid passage means for establishing communication between one of said first and second chambers and said vortex chamber, which first fluid passage means extends through one of horizontal sections of said piston and having an inner end tangentially opening to said vortex chamber on the horizontal periphery of the vortex chamber for discharging the fluid into said vortex chamber in vortex fashion;
 said fluid passage means for communication between the other fluid chamber and said vortex chamber.

2. A vortex flow shock absorber comprising:
 a hollow cylinder defining therein a fluid chamber filled with a working fluid, which cylinder having connecting means at the lower end thereof for connecting said cylinder onto a member for absorbing a shock applied thereto;
 a piston reciprocally disposed within said fluid chamber to divide the fluid chamber into an upper first chamber and a lower second chamber, said piston being attached onto a lower end of a piston rod connecting the former to another member for absorbing the shock applied thereto and cooperating therewith for motion in response to the shock, said piston including upper and lower horizontal sections and an annular circumferential section, which sections define a vortex chamber within said piston;
 first fluid passage means incorporated in said upper horizontal section for defining therein a first fluid passage for communication between said first chamber and said vortex chamber, said first fluid passage means extending through said upper horizontal section and opening to said vortex chamber on the inner surface of said upper horizontal section and directed in tangential direction with respect to the circle of the vortex chamber;
 second fluid passage means incorporated in said lower horizontal section for defining a second fluid passage for communication between said vortex chamber and said second fluid passage, said second fluid passage means defining the second fluid passage.

3. A vortex flow shock absorber comprising:
 a hollow cylinder defining therein a fluid chamber filled with a working fluid, which cylinder having connecting means at the lower end thereof for connecting said cylinder onto a member for absorbing a shock applied thereto;

a piston reciprocally disposed within said fluid chamber to divide the fluid chamber into an upper first chamber and a lower second chamber, said piston being attached onto a lower end of a piston rod connecting the former to another member for absorbing the shock applied thereto and cooperating therewith for motion in response to the shock, said piston including upper and lower horizontal sections and an annular circumferential section, which sections define a vortex chamber within said piston;

first fluid passage means, attached to the inner surface of said upper horizontal section, for defining an annular chamber between said inner surface of said upper horizontal section and upper surface thereof adjacent the circumference thereof, said first fluid passage means further defining a first fluid passage for communication between said vortex chamber and said upper chamber; and second fluid passage means incorporated in said lower horizontal section for defining a second fluid passage for communication between said vortex chamber and said second chamber, said second fluid passage means defining the second fluid passage.

4. A shock absorber as set forth in claim 1, 2 or 3, wherein said first fluid passage has a sectional area small enough to restrict the fluid flow therethrough for producing the absorbing force.

5. A shock absorber as set forth in claim 1, 2 or 3, further including a third fluid passage defined in said piston for communication between one of said first and second chambers and said vortex chamber, which third fluid passage is normally closed with an elastic closure member which opens in response to the fluid pressure in said vortex chamber.

6. A direct-acting shock absorber comprising:

an outer hollow cylinder;

an inner hollow cylinder coaxially disposed within said outer cylinder to define therebetween a fluid reservoir chamber, said inner cylinder defining therein a fluid chamber filled with a working fluid;

a piston reciprocally disposed within said fluid chambe to divide said fluid chamber into an upper first chamber and a lower second chamber, said piston having an upper horizontal section and a lower horizontal section and defining therebetween a substantially circular vortex chamber;

first fluid passage means for defining a first fluid passage in said piston for communication between said first chamber and said vortex chamber, said first fluid passage extending through the upper horizonal section of said piston and opening to said vortex chamber for discharging the working fluid flowing therethrough in a tangential direction with respect to the circle of the vortex chamber;

second fluid passage means for defining a second fluid passage in said piston for communication between said vortex chamber and said second chamber;

a bottom fitting fitted to the lower end of said inner cylinder and having upper and lower horizontal sections and defining therebetween a substantially circular bottom vortex chamber;

third fluid passage means for defining a third fluid passage for communication between said second chamber and said bottom vortex chamber, said third fluid passage extending through the upper horizontal section of said bottom fitting and opening to said bottom vortex chamber for discharging the working fluid in a tangential direction with respect to the circle of the bottom fitting; and fourth fluid passage means for defining a fourth fluid passage for communication between said bottom vortex chamber and said fluid reservoir chamber, which fourth fluid passage having a sectional area adapted for producing resistance against the fluid flowing therethrough.

7. A direct-acting shock absorber comprising:

an outer hollow cylinder;

an inner hollow cylinder coaxially disposed within said outer cylinder to define therebetween a fluid reservoir chamber, said inner cylinder defining therein a fluid chamber filled with a working fluid;

a piston reciprocally disposed within said fluid chamber to divide said fluid chamber into an upper first chamber and a lower second chamber, said piston having upper and lower horizontal sections and defining therebetween a substantially circular vortex chamber;

first fluid passage means, attached to the inner surface of said upper horizontal section, for defining an annular chamber between said inner surface of said upper horizontal section and upper surface thereof adjacent the circumference thereof, said first fluid passage means further defining a first fluid passage for communication between said vortex chamber and said first chamber;

second fluid passage means for defining a second fluid passage in said piston for communication between said vortex chamber and said second chamber;

a bottom fitting fitted to the lower end of said inner cylinder and having upper and lower horizontal sections and defining therebetween a substantially circular bottom vortex chamber;

third fluid passage means, attached to the inner surface of said upper horizontal section of said bottom fitting for defining an annular chamber between said inner surface of said upper horizontal section of said bottom fitting and upper surface thereof adjacent the circumference thereof, said third fluid passage means further defining a third fluid passage for communication between said bottom vortex chamber and said second chamber; and fourth fluid passage means for defining a fourth fluid passage for communication between said bottom vortex chamber and said fluid reservoir chamber, which fourth fluid passage has a sectional area adapted for producing resistance against the fluid flowing therethrough.

8. A shock absorber as set forth in claim 6 or 7, wherein said first fluid passage has a sectional area small enough to restrict the fluid flow therethrough for producing the absorbing force.

9. A shock absorber as set forth in claim 6 or 7, further including a third fluid passage defined in said piston for communication between one of said first and second chambers and said vortex chamber, which third fluid passage is normally closed with an elastic closure member which opens in response to the fluid pressure in said vortex chamber.

* * * * *